(12) United States Patent
Lemay et al.

(10) Patent No.: US 11,895,087 B2
(45) Date of Patent: Feb. 6, 2024

(54) ADJUSTING FIREWALL PARAMETERS BASED ON NODE CHARACTERISTICS

(71) Applicant: International Business Machines Corporation, Armonk, NY (US)

(72) Inventors: Monica J. Lemay, Cedar Park, TX (US); Todd Tosseth, Vail, AZ (US); Jacob M. Tick, Tucson, AZ (US); Christina Lara, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 162 days.

(21) Appl. No.: 16/108,025

(22) Filed: Aug. 21, 2018

(65) Prior Publication Data
US 2020/0067879 A1 Feb. 27, 2020

(51) Int. Cl.
*H04L 41/0853* (2022.01)
*H04L 9/40* (2022.01)

(52) U.S. Cl.
CPC ...... *H04L 63/0218* (2013.01); *H04L 41/0853* (2013.01); *H04L 63/0263* (2013.01); *H04L 63/20* (2013.01)

(58) Field of Classification Search
CPC ............. H04L 63/0218; H04L 41/0853; H04L 63/0263; H04L 63/20
See application file for complete search history.

(56) References Cited

U.S. PATENT DOCUMENTS

| | | | |
|---|---|---|---|
| 7,721,330 B1 * | 5/2010 | Nachenberg | H04L 63/0227 713/153 |
| 8,922,590 B1 * | 12/2014 | Luckett, Jr. | H04W 12/068 345/633 |
| 9,843,512 B2 | 12/2017 | Makhervaks et al. | |
| 10,379,894 B1 * | 8/2019 | Cruz Oliveira Queiros | H04L 63/08 |
| 2003/0120955 A1 * | 6/2003 | Bartal | H04L 41/0894 726/4 |
| 2012/0054776 A1 * | 3/2012 | Yu | H04L 41/044 719/317 |
| 2013/0275582 A1 * | 10/2013 | Gedam | H04L 41/0213 709/224 |
| 2014/0115666 A1 * | 4/2014 | Garcia Morchon | H04L 9/3242 726/3 |
| 2016/0092570 A1 * | 3/2016 | Ago | H04W 4/60 707/770 |
| 2016/0191570 A1 | 6/2016 | Bansal et al. | |

(Continued)

FOREIGN PATENT DOCUMENTS

WO 2016076900 A1 5/2016

OTHER PUBLICATIONS

Anonymous, "NIST Cloud Computing Program," NIST, Information Technology Laboratory, Nov. 13, 2013, pp. 1-2, retrieved from www.nist.gov/itl/cloud/.

(Continued)

*Primary Examiner* — Lynn D Feild
*Assistant Examiner* — Vladimir I Gavrilenko
(74) *Attorney, Agent, or Firm* — Zilka-Kotab, P.C.

(57) ABSTRACT

A computer-implemented method according to one embodiment includes identifying a node within a clustered system, determining a role of the node, based on one or more characteristics of the node, and setting one or more firewall parameters for the node within the clustered system, based on the role of the node.

19 Claims, 6 Drawing Sheets

(56) References Cited

U.S. PATENT DOCUMENTS

| | | |
|---|---|---|
| 2017/0250951 A1 | 8/2017 | Wang et al. |
| 2017/0366504 A1 | 12/2017 | Zhou et al. |
| 2018/0048623 A1 | 2/2018 | Bansal et al. |
| 2018/0234422 A1* | 8/2018 | Odom .................. G06F 21/62 |
| 2019/0190771 A1* | 6/2019 | Fang .................... H04L 41/40 |

OTHER PUBLICATIONS

Mell et al., "The NIST Definition of Cloud Computing," Version 15, Dec. 7, 2009, pp. 1-2.
Mell et al., "The NIST Definition of Cloud Computing," Recommendations of the National Institute of Standards and Technology, NIST Special Publication 800-145, Sep. 2011, pp. 1-7.

* cited by examiner

ADJUSTING FIREWALL PARAMETERS BASED ON NODE CHARACTERISTICS

BACKGROUND

The present invention relates to security firewalls, and more specifically, this invention relates to dynamically adjusting parameters of a firewall based on characteristics of a node within a clustered system.

Clusters of computing systems (e.g., clustered systems) are commonly used to perform various actions, such as data storage and processing. Implementing security for these clustered systems utilizing a firewall is an importance concern. There is also a need to adjust firewall security of a clustered system in response to one or more nodes changing the actions they perform within the clustered system.

SUMMARY

A computer-implemented method according to one embodiment includes identifying a node within a clustered system, determining a role of the node, based on one or more characteristics of the node, and setting one or more firewall parameters for the node within the clustered system, based on the role of the node.

According to another embodiment, a computer program product for adjusting firewall parameters based on node characteristics includes a computer readable storage medium having program instructions embodied therewith, where the computer readable storage medium is not a transitory signal per se, and where the program instructions are executable by a processor to cause the processor to perform a method comprising identifying, by the processor, a node within a clustered system, determining, by the processor, a role of the node, based on one or more characteristics of the node, and setting, by the processor, one or more firewall parameters for the node within the clustered system, based on the role of the node.

A system according to another embodiment includes a processor, and logic integrated with the processor, executable by the processor, or integrated with and executable by the processor, where the logic is configured to identify a node within a clustered system, determine a role of the node, based on one or more characteristics of the node, and set one or more firewall parameters for the node within the clustered system, based on the role of the node.

Other aspects and embodiments of the present invention will become apparent from the following detailed description, which, when taken in conjunction with the drawings, illustrate by way of example the principles of the invention.

DETAILED DESCRIPTION

Figure 1:
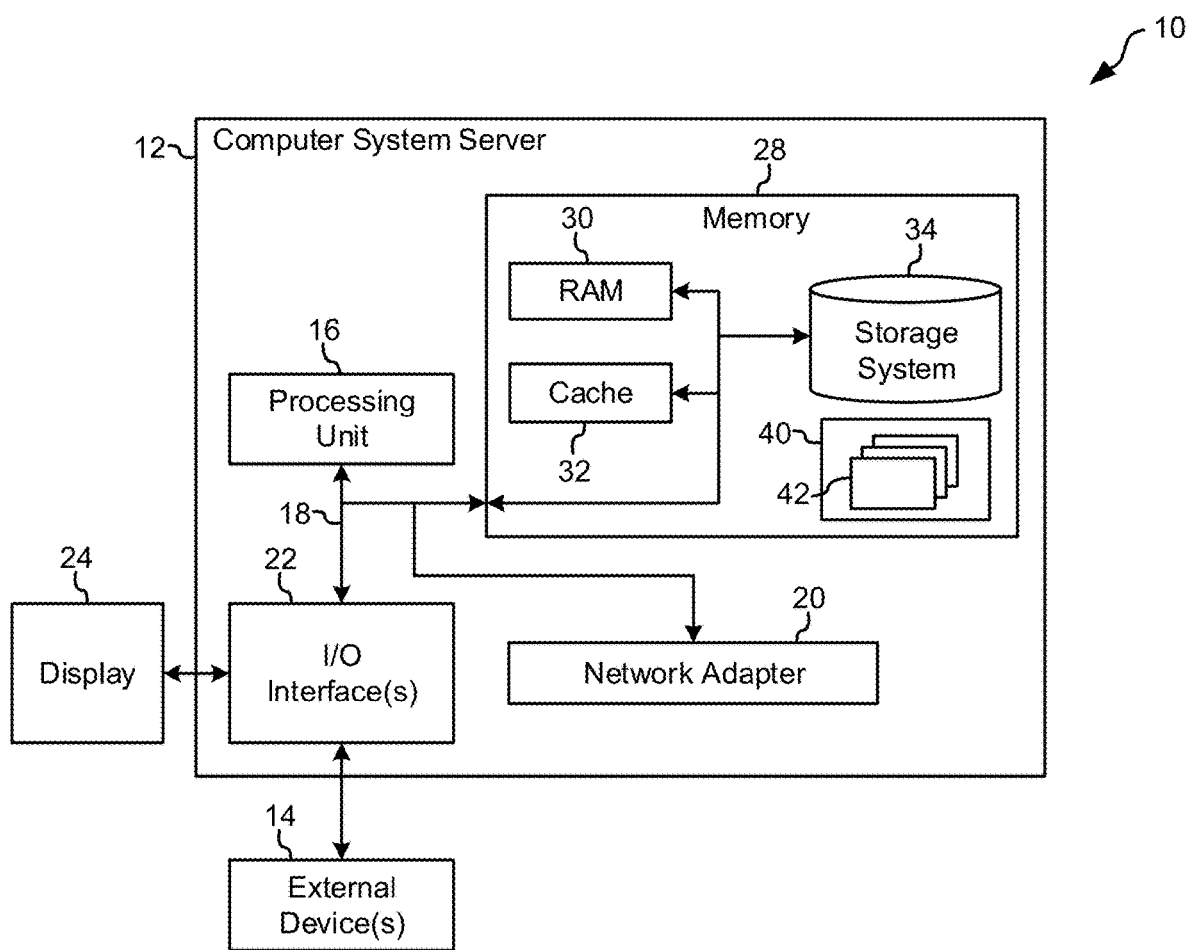
FIG. 1 depicts a cloud computing node according to an embodiment of the present invention.

The following description discloses several preferred embodiments of systems, methods and computer program products for adjusting firewall parameters based on node characteristics. Various embodiments provide a method for determining characteristics of a node, and setting firewall parameters for the node, based on the characteristics.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "includes" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several preferred embodiments of systems, methods and computer program products for adjusting firewall parameters based on node characteristics.

In one general embodiment, a computer-implemented method includes identifying a node within a clustered system, determining a role of the node, based on one or more characteristics of the node, and setting one or more firewall parameters for the node within the clustered system, based on the role of the node.

In another general embodiment, a computer program product for adjusting firewall parameters based on node characteristics includes a computer readable storage medium having program instructions embodied therewith, where the computer readable storage medium is not a transitory signal per se, and where the program instructions are executable by a processor to cause the processor to perform a method comprising identifying, by the processor, a node within a clustered system, determining, by the processor, a role of the node, based on one or more characteristics of the node, and setting, by the processor, one or more firewall parameters for the node within the clustered system, based on the role of the node.

In another general embodiment, a system includes a processor, and logic integrated with the processor, executable by the processor, or integrated with and executable by the processor, where the logic is configured to identify a node within a clustered system, determine a role of the node, based on one or more characteristics of the node, and set one or more firewall parameters for the node within the clustered system, based on the role of the node.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
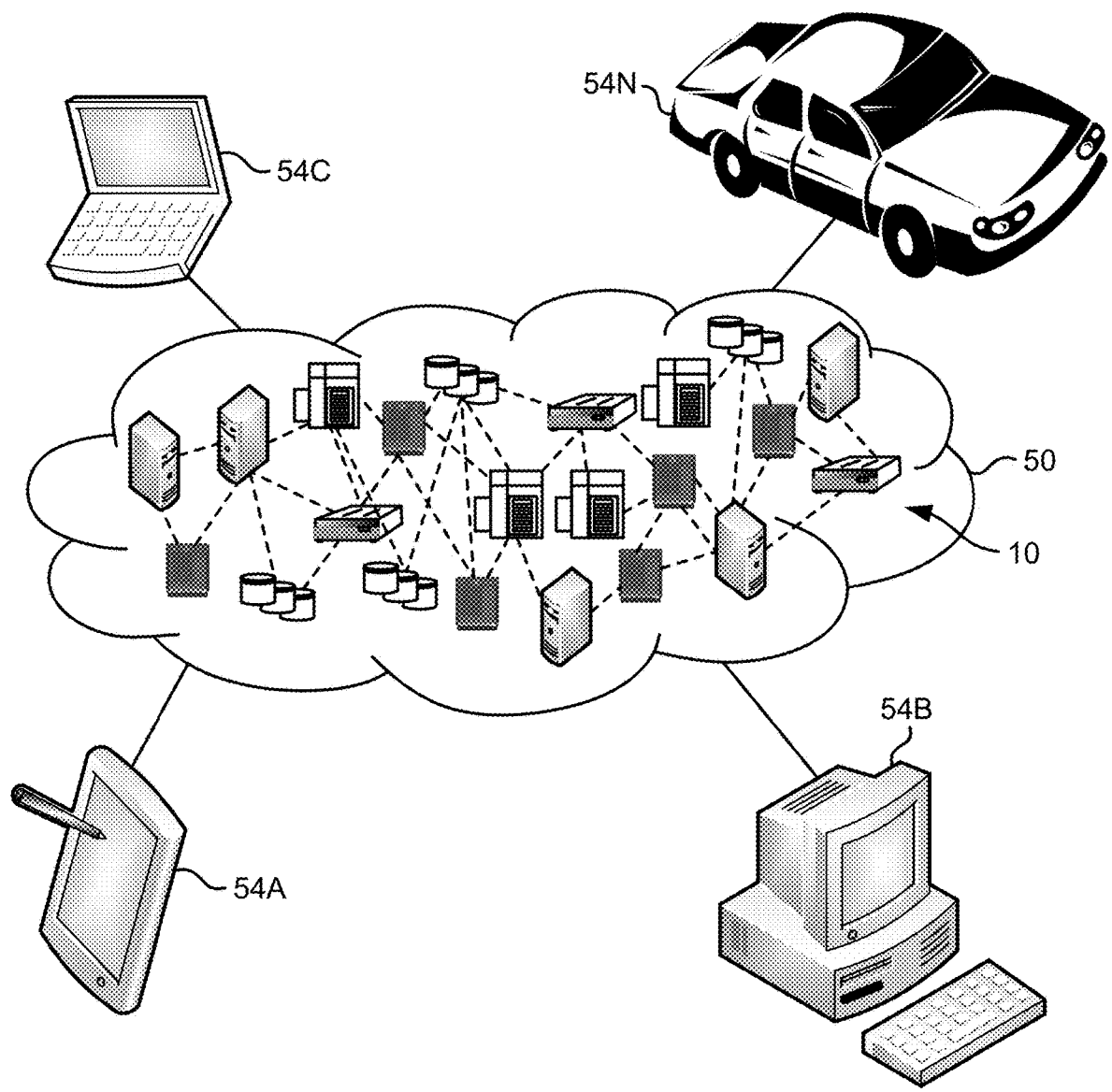
FIG. 2 depicts a cloud computing environment according to an embodiment of the present invention.

Referring now to FIG. 2, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
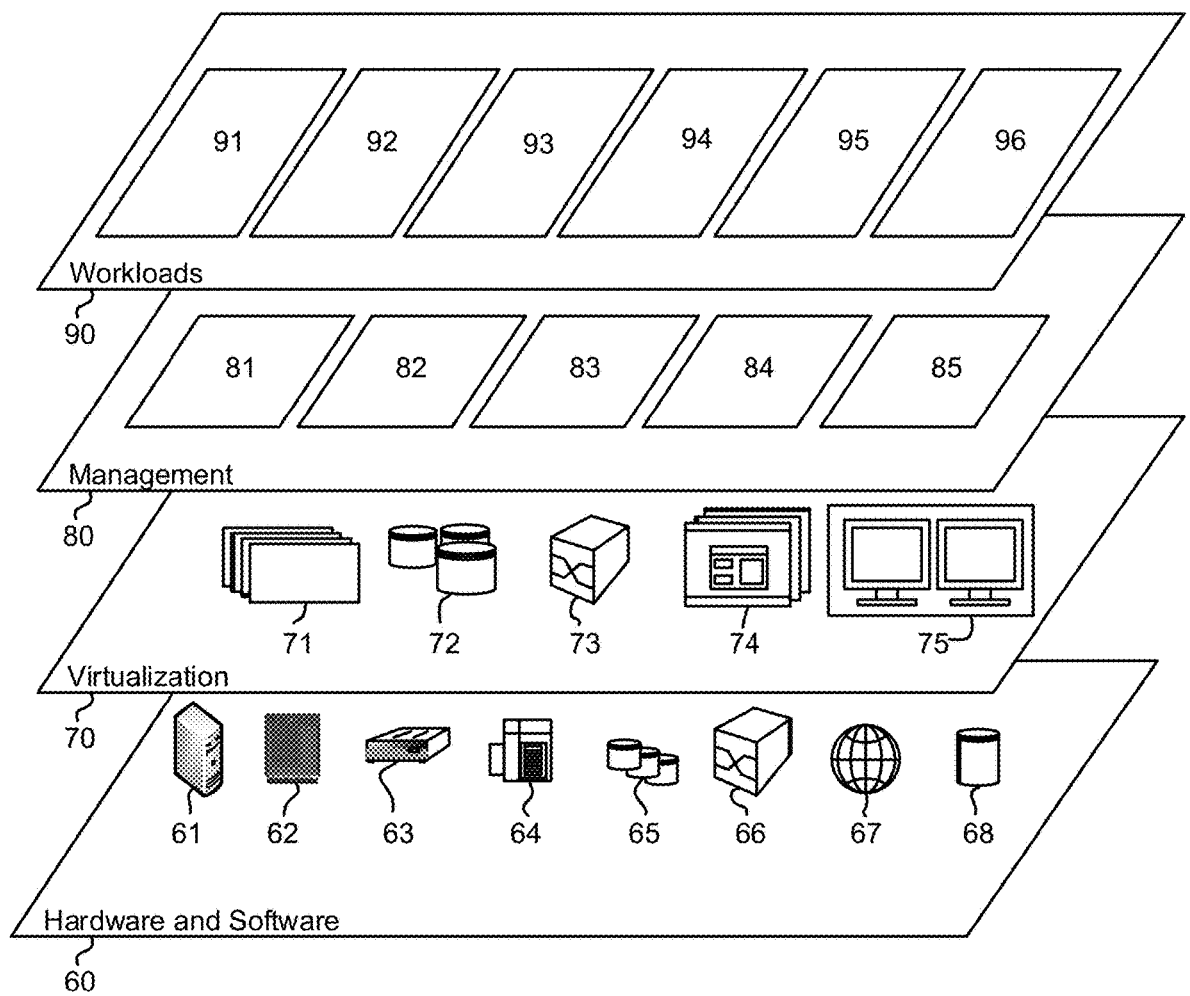
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and data storage and management 96.

Figure 4:
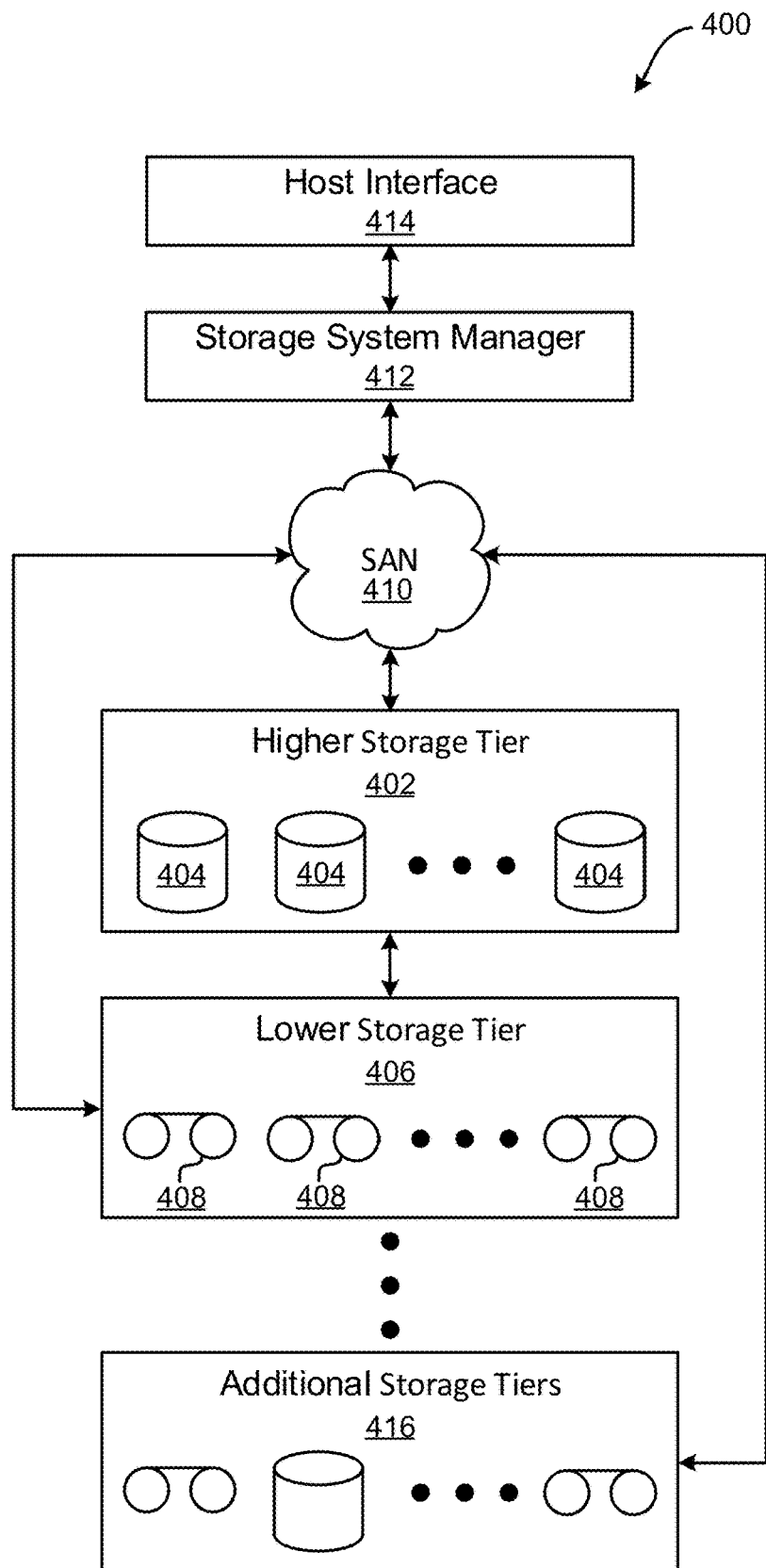
FIG. 4 illustrates a tiered data storage system in accordance with one embodiment.

Now referring to FIG. 4, a storage system 400 is shown according to one embodiment. Note that some of the elements shown in FIG. 4 may be implemented as hardware and/or software, according to various embodiments. The storage system 400 may include a storage system manager 412 for communicating with a plurality of media on at least one higher storage tier 402 and at least one lower storage tier 406. The higher storage tier(s) 402 preferably may include one or more random access and/or direct access media 404, such as hard disks in hard disk drives (HDDs), nonvolatile memory (NVM), solid state memory in solid state drives (SSDs), flash memory, SSD arrays, flash memory arrays, etc., and/or others noted herein or known in the art. The lower storage tier(s) 406 may preferably include one or more lower performing storage media 408, including sequential access media such as magnetic tape in tape drives and/or optical media, slower accessing HDDs, slower accessing SSDs, etc., and/or others noted herein or known in the art. One or more additional storage tiers 416 may include any combination of storage memory media as desired by a designer of the system 400. Also, any of the higher storage tiers 402 and/or the lower storage tiers 406 may include some combination of storage devices and/or storage media.

The storage system manager 412 may communicate with the storage media 404, 408 on the higher storage tier(s) 402 and lower storage tier(s) 406 through a network 410, such as a storage area network (SAN), as shown in FIG. 4, or some other suitable network type. The storage system manager 412 may also communicate with one or more host systems (not shown) through a host interface 414, which may or may not be a part of the storage system manager 412. The storage system manager 412 and/or any other component of the storage system 400 may be implemented in hardware and/or software, and may make use of a processor (not shown) for executing commands of a type known in the art, such as a central processing unit (CPU), a field programmable gate array (FPGA), an application specific integrated circuit (ASIC), etc. Of course, any arrangement of a storage system may be used, as will be apparent to those of skill in the art upon reading the present description.

In more embodiments, the storage system 400 may include any number of data storage tiers, and may include the same or different storage memory media within each storage tier. For example, each data storage tier may include the same type of storage memory media, such as HDDs, SSDs, sequential access media (tape in tape drives, optical disk in optical disk drives, etc.), direct access media (CD-ROM, DVD-ROM, etc.), or any combination of media storage types. In one such configuration, a higher storage tier 402, may include a majority of SSD storage media for storing data in a higher performing storage environment, and remaining storage tiers, including lower storage tier 406 and additional storage tiers 416 may include any combination of SSDs, HDDs, tape drives, etc., for storing data in a lower performing storage environment. In this way, more frequently accessed data, data having a higher priority, data needing to be accessed more quickly, etc., may be stored to the higher storage tier 402, while data not having one of these attributes may be stored to the additional storage tiers 416, including lower storage tier 406. Of course, one of skill in the art, upon reading the present descriptions, may devise many other combinations of storage media types to implement into different storage schemes, according to the embodiments presented herein.

According to some embodiments, the storage system (such as 400) may include logic configured to receive a request to open a data set, logic configured to determine if the requested data set is stored to a lower storage tier 406 of a tiered data storage system 400 in multiple associated portions, logic configured to move each associated portion of the requested data set to a higher storage tier 402 of the tiered data storage system 400, and logic configured to assemble the requested data set on the higher storage tier 402 of the tiered data storage system 400 from the associated portions.

Of course, this logic may be implemented as a method on any device and/or system or as a computer program product, according to various embodiments.

Figure 5:
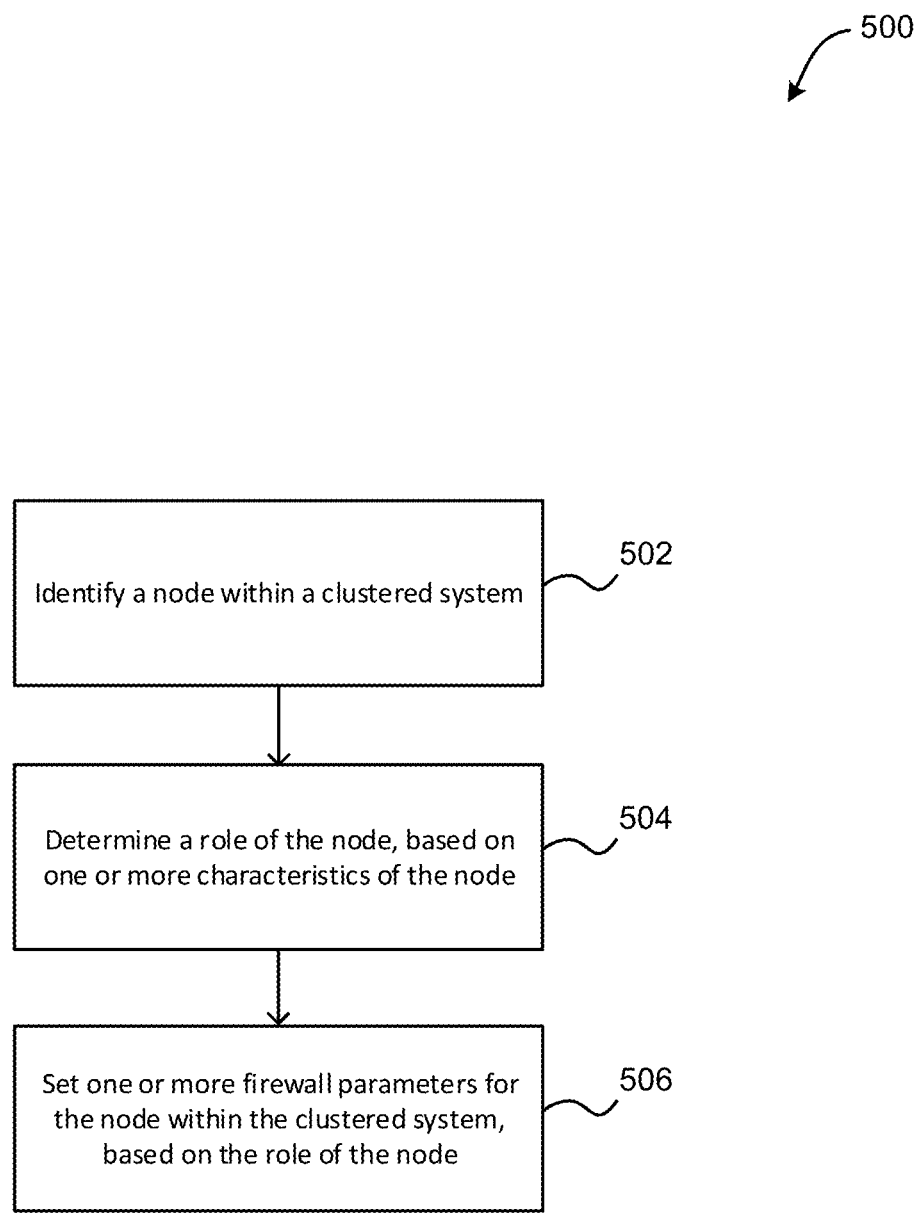
FIG. 5 illustrates a flowchart of a method for adjusting firewall parameters based on node characteristics, in accordance with one embodiment.

Now referring to FIG. 5, a flowchart of a method 500 is shown according to one embodiment. The method 500 may be performed in accordance with the present invention in any of the environments depicted in FIGS. 1-4, among others, in various embodiments. Of course, more or less operations than those specifically described in FIG. 5 may be included in method 500, as would be understood by one of skill in the art upon reading the present descriptions.

Each of the steps of the method 500 may be performed by any suitable component of the operating environment. For example, in various embodiments, the method 500 may be partially or entirely performed by one or more servers, computers, or some other device having one or more processors therein. The processor, e.g., processing circuit(s), chip(s), and/or module(s) implemented in hardware and/or software, and preferably having at least one hardware component may be utilized in any device to perform one or more steps of the method 500. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 5, method 500 may initiate with operation 502, where a node is identified within a clustered system. In one embodiment, the clustered system includes a plurality of connected nodes that work together to perform one or more actions. In another embodiment, the clustered system may include a cloud computing environment. In yet another embodiment, the clustered system may be viewed as a single entity by one or more users, clients, etc. In still another embodiment, each node within the clustered system may include a computing device (e.g., a server, etc.).

Additionally, in one embodiment, the node is identified in response to one or more predetermined actions. For example, the node may be identified in response to the addition of the node to the clustered system. In another example, the node may be identified in response to a failure of another node within the clustered system. For instance, a first node may include a failover/backup/recovery node for a second node, and the first node may be identified in response to the failure of the second node. In yet another example, the node may be identified in response to an initial deployment of the clustered system. For instance, when the clustered system is first deployed, all nodes within the clustered system may be identified.

Further, in one embodiment, the node is identified by a module within the clustered system. For example, the module may be running on a plurality of nodes within the clustered system. In another example, the module may be running on a single node within the clustered system. In yet another example, the module may be included within a module management application of the clustered system.

Further still, in one embodiment, the node is identified by a module outside of the clustered system. For example, the module may be running on a device (e.g., a computing system, etc.) separate from the clustered system.

Also, method 500 may proceed with operation 504, where a role of the node is determined, based on one or more characteristics of the node. In one embodiment, the role of the node includes a current function of the node within the clustered system. In another embodiment, the one or more characteristics of the node may include one or more processes, services, and applications currently running on the node. For example, determining the role of the node may include analyzing the node and identifying the one or more processes, services, and applications currently running on the node.

In addition, in one embodiment, determining the role of the node includes comparing the one or more characteristics of the node to predetermined criteria. For example, determining the role of the node may include comparing the one or more processes, services, and applications currently running on the node to predetermined processes, services, and applications that are associated with predetermined roles within the clustered system. For instance, one or more tables may store a plurality of roles that are each linked to one or more predetermined processes, services, and applications currently running on a node. The one or more processes, services and applications currently running on the node may be compared to the table, and a role may be determined for the node if the processes, services and applications currently running on the node match a predetermined number of processes, services and applications linked to the role within the table.

Furthermore, in one example, a node may be currently running one or more graphical user interface (GUI) processes. These GUI processes may be linked to a GUI role within a table, and as a result, a GUI role may be determined for the node. In another example, a node may be currently running one or more storage processes. These storage processes may be linked to a storage role within a table, and as a result, a storage role may be determined for the node. In yet another example, a node may be currently running one or more protocol and/or application server processes. These protocol and/or application server processes may be linked to an application server role within a table, and as a result, an application server role may be determined for the node.

In this way, a role may be dynamically determined for the node, based on one or more processes, services, and applications currently running on the node.

Further still, in one embodiment, the determined role is assigned to the node once it is determined. For example, the determined role may be stored as metadata within the node. In another embodiment, the one or more characteristics of the node include metadata stored within the node. For example, e.g., the role of the node may be manually determined, and stored as metadata within a predetermined storage location within the node.

Also, method 500 may proceed with operation 506, where one or more firewall parameters for the node are set within the clustered system, based on the role of the node. In one embodiment, the firewall includes a network security implementation within the clustered system that monitors and controls incoming and outgoing network traffic based on predetermined parameters. In another embodiment, the firewall parameters include one or more actions performed by the firewall.

For example, the firewall parameters may include the opening and/or closing of one or more predetermined ports within the clustered system. The ports that are opened may be ports determined to be necessary for the processes, services, and applications associated with the role, and the ports that are closed may be ports determined to be not necessary for the processes, services, and applications associated with the role.

Additionally, in one embodiment, the firewall parameters include one or more limitations imposed by the firewall. For example, the firewall parameters may include the limiting of data access via one or more predetermined ports within the clustered system. For instance, the limiting of access may include allowing only read access through one or more predetermined ports, etc. In another example, the limiting of access may include allowing access through one or more predetermined ports to only a predetermined set of internet addresses (e.g., IP addresses, etc.) listed in an IP table, etc. Of course, however, the one or more firewall parameters may include any function or parameter implemented by a firewall and/or IP table.

Further, in one embodiment, the one or more firewall parameters are associated with the role of the node. For example, a table may store a plurality of predetermined roles for a node within the clustered system, where each role is associated with one or more predetermined firewall parameters. The role determined for the node may be compared to the table to find a matching predetermined role, and predetermined firewall parameters associated with the matching predetermined role may be set for the node. In another embodiment, the node may be implemented within the clustered system, according to the one or more firewall parameters.

In this way, firewall parameters may be automatically assigned to the node, based on the role of the node. This may increase an accuracy of the firewall parameters assigned to the node, which may increase a security of the node and the clustered system. This may also optimize firewall parameters with respect to operations currently being performed by the node, which may increase a performance of the node (e.g., by avoiding unnecessary restrictions imposed by inaccurate firewall parameters, etc.).

Figure 6:
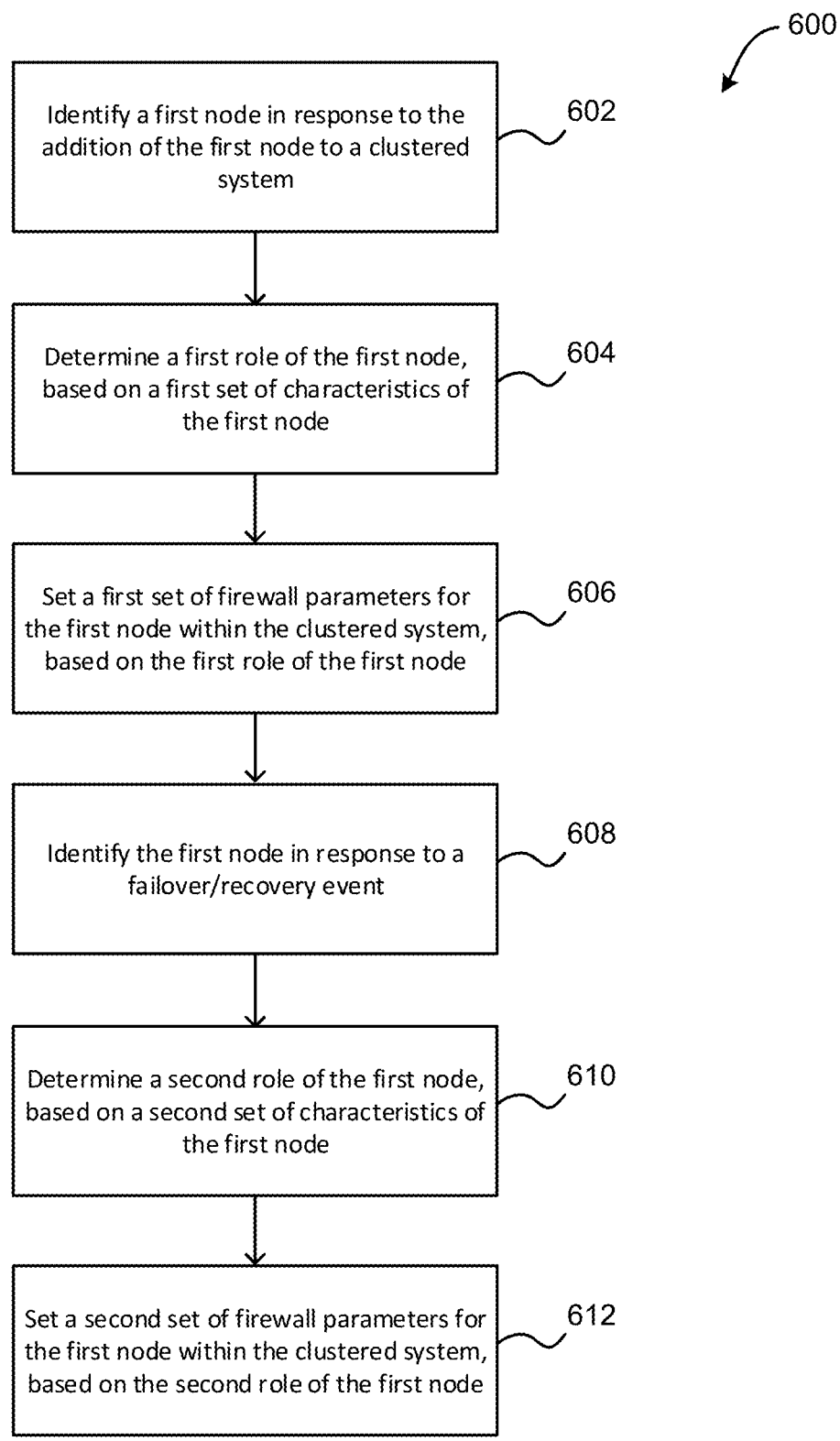
FIG. 6 illustrates a flowchart of a method for adjusting firewall parameters for a node, in accordance with one embodiment.

Now referring to FIG. 6, a flowchart of a method 600 for adjusting firewall parameters for a node is shown according to one embodiment. The method 600 may be performed in accordance with the present invention in any of the environments depicted in FIGS. 1-4, among others, in various embodiments. Of course, more or less operations than those specifically described in FIG. 6 may be included in method 600, as would be understood by one of skill in the art upon reading the present descriptions.

Each of the steps of the method 600 may be performed by any suitable component of the operating environment. For example, in various embodiments, the method 600 may be partially or entirely performed by one or more servers, computers, or some other device having one or more processors therein. The processor, e.g., processing circuit(s), chip(s), and/or module(s) implemented in hardware and/or software, and preferably having at least one hardware component may be utilized in any device to perform one or more steps of the method 600. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 6, method 600 may initiate with operation 602, where a first node is identified in response to the addition of the first node to a clustered system. In one embodiment, the node is added to the clustered system along with a plurality of additional nodes (e.g., during an initial deployment of the clustered system). In another embodiment, the node is added to the clustered system as part of an expansion of the cluster. For example, the node may be added to an existing cluster in order to expand the cluster (e.g., by adding available resources to the cluster, etc.). In yet another embodiment, a deployment tool of the clustered system may identify the first node.

Additionally, method 600 may proceed with operation 604, where a first role of the first node is determined, based on a first set of characteristics of the first node. In one embodiment, the first set of characteristics of the first node may include characteristics currently implemented by the first node (e.g., include one or more processes, services, and applications currently running on the node, etc.).

Further, method 600 may proceed with operation 606, where a first set of firewall parameters are set for the first node within the clustered system, based on the first role of the first node. Further still, method 600 may proceed with operation 608, where the first node is identified in response to a failover/recovery event. In one embodiment, the failover/recovery event includes the failure of a second node other than the first node within the clustered system.

For example, a health monitoring module within the clustered system may monitor all nodes within the clustered system. The health monitoring module may identify the failure of the second node within the clustered system, and the health monitoring module may identify the first node as a backup node for the second node in case of a failure of the second node. In another example, the first node may be listed as a backup node for the second node in a cluster definition file stored within the clustered system.

Also, method 600 may proceed with operation 610, where a second role of the first node is determined, based on a second set of characteristics of the first node. In one embodiment, the second set of characteristics of the first node are implemented by the first node in response to the failure of the second node. For example, the node may run one or more different processes, services, and applications in response to the failure of the second node in order to act as a backup for the second node within the clustered system. In another example, the second role may be different from the first role.

In addition, method 600 may proceed with operation 612, where a second set of firewall parameters are set for the first node within the clustered system, based on the second role of the first node. In one embodiment, the second set of firewall parameters are different from the first set of firewall parameters. In another embodiment, the second set of firewall parameters are optimized for the second set of characteristics of the first node during the failover/recovery event. In yet another embodiment, the first set of firewall parameters may be removed for the first node. For example, one or more ports may be closed that were opened according to the first set of firewall parameters, access limitations imposed according to the first set of firewall parameters may be removed, etc.

In this way, the firewall parameters for the first node may be dynamically adjusted to facilitate new operations performed by the first node while the first node supports the failed second node within the clustered system.

In one embodiment, a first node within a clustered system may function as a storage access node. For example, the first node may run one or more processes, services, and/or applications that facilitate storage access within the clustered system. When the node is first added to the clustered system, the processes, services, and/or applications run within the first node may be identified and compared to a role determination mapping table. For example, the processes, services, and/or applications run within the first node may match all or a threshold portion of processes, services, and/or applications mapped to a storage access role within the role determination table. In response to this match, the first node may be assigned the storage access role. For example, the storage access role may be added to metadata stored within the first node.

Additionally, in one embodiment, the storage access role of the first node may be compared to a firewall parameter mapping table. For example, the storage access role may match a storage access role stored within the firewall parameter mapping table that maps to a first plurality of predetermined firewall parameters. These predetermined firewall parameters that map to the storage access role may be predetermined to optimize operation of a node operating in the storage access role.

In response to this match, the first plurality of predetermined firewall parameters may be set for the first node. The first node may then be implemented within the clustered system according to the first plurality of predetermined firewall parameters.

Further, in one embodiment, a failure of a second node may be identified within the clustered system. In another embodiment, the second node may function as an application server. For example, the second node may run one or more processes, services, and/or applications that facilitate the serving of applications within the clustered system to one or more clients. In yet another embodiment, the first node may be identified as a backup node for the second node. For example, the first node may be listed within a cluster definition file as a backup node for the second node in case of a failure of the second node.

Further still, in one embodiment, in response to the failure of the second node, the first node may stop running run one or more processes, services, and/or applications that facilitate storage access within the clustered system. Additionally, the first node may start running one or more processes, services, and/or applications that facilitate the serving of applications within the clustered system to one or more clients. In this way, the first node may provide the services of the failed second node within the clustered system.

Also, in one embodiment, in response to identifying the failure of the second node, and identifying the first node as a backup node for the second node, the new processes, services, and/or applications run within the first node may be identified and compared to the role determination mapping table. For example, the new processes, services, and/or applications run within the first node may match all or a threshold portion of processes, services, and/or applications mapped to an application server role within the role determination table. In response to this match, the role of the first node may be switched from the storage access role to the application server role. For example, the storage access role may be removed from metadata stored within the first node, and the application server role may be added as metadata stored within the first node.

In addition, in one embodiment, the updated application server role of the first node may be compared to a firewall parameter mapping table. For example, the application server role may match an application server role stored within the firewall parameter mapping table that maps to a second plurality of predetermined firewall parameters. These predetermined firewall parameters that map to the application server role may be predetermined to optimize operation of a node operating in the application server role.

In response to this match, the first plurality of predetermined firewall parameters may be removed for the first node, and the second plurality of predetermined firewall parameters may be set for the first node. The first node may then be implemented within the clustered system according to the second plurality of predetermined firewall parameters.

Furthermore, in one embodiment, the role of the first node may be changed back to the storage access role when the second node is restored within the clustered system and the first node resumes running one or more processes, services, and/or applications that facilitate storage access within the clustered system, and stops running one or more processes, services, and/or applications that facilitate the serving of applications within the clustered system to one or more clients. In response to this role change, the firewall parameters may be dynamically updated as well to predetermined firewall parameters that optimize operation of a node operating in the storage access role.

In this way, as processes, services, and/or applications that are run within a node change, its role within the clustered system may be dynamically updated, in addition to firewall parameters that optimize the implementation of those processes, services, and/or applications associated with the updated role.

Assigning Process/Service Based Firewall Rules and Policies in a Clustered System Environment to be Dynamic with Changes in a Cluster Secured solutions are important in computing environments. Firewalls are one example of a method to prevent unwanted entry into a system. Because applications might either need to communicate to other systems or share data, not all ports can be closed behind a firewall. For this reason, iptables and firewall-cmd may be used to open ports and create policies to allow only trusted applications and systems.

In clustered solutions, nodes may not all have the same role or function. For example, one node may function as a Graphical User Interface (GUI) node. Another node may function to access storage. Another node may function as a protocol or application server to PC clients. Each one of these roles requires a different set of firewall rules/policies to secure the system. For example, the GUI node may have all ports secured except port 5006. The node that functions as an interface to storage devices will have port 5006 closed but 2139 open for its role.

One of the benefits of clusters is flexibility. For example, if the GUI node should suddenly crash, this doesn't have to be an outage. The storage node can step in and function in a GUI capacity. Port 5006 may have to be opened and a new IP address may be provided to consumers of the GUI. This is one of the benefits of a cluster. Redundancy can be just a matter of opening a firewall port and starting a process or service.

Cloud environments and HPC environments can have clusters that are hundreds to thousands of nodes. Some will have a single role, others may have multiple roles which will require having multiple firewall ports to be open.

The initial setup of this can be very lengthy and time consuming. For example, admins may assemble some kind of table or reference to track each nodes' many roles and the corresponding firewall ports to open.

Once done, the cluster is secured. However, in the case of nodes changing roles or picking up new roles, or dropping roles, an admin has the burden of remembering to enable and disable the corresponding firewall ports. This is quite a burden in a large cluster.

In one embodiment, firewall rules and policies may be assigned, removed and maintained based on roles, processes, services and applications in the clustered environment. This will eliminate the burden of the admin during the initial configuration of the nodes and during any change of assignment of a node.

In one embodiment, firewall rules and policies may be created for ports based on the role of the node in a cluster. It can also be based on processes, services or applications running on a node. A pre-determined set of firewall rules can be written to pair ports to applications, processes, services. Also, roles can be associated with applications, processes or services thereby making the level of granularity very flexible. Software could utilize the concept by pre-loading suggested rules and policies. Expanding on the pre-determined list can be a tool or wizard that queries the admin for additional pairings.

In another embodiment, the associations of ports/rules/policies to processes/services/applications/roles that is built is not only used to implement the firewall rules and policies but to maintain them across the cluster as nodes change roles, as rules/policies change for a set of processes/services/applications/roles, and as processes/services/applications are stopped and started. In other words, even if a nodes' role is static, processes associated with the role may stop and start. The rules can also be associated with a process stopping (e.g., close the port) and then process starting (e.g., open the port).

In yet another embodiment, a high-level process may be implemented to pair rules to nodes. The first step is to establish a pairing of firewall rules and policies to processes/applications/services or a bundle of the latter (processes, applications, services), called a role. This would be provided to the admin/customer as a set of pre-canned or predetermined pairings.

Second, the admin can create custom pairings of rules to processes, applications, services, and roles. Third, the admin may provide the name or IP of a node and its role into a tool that has the pre-determined set of rules and policies as well as the custom rules. This step is the assignment of the rules to the node.

Fourth, the admin can either have the assignment of the rules to the node be an automatic feature or it can be done manually by the administrator. Either the initial implementation at install and/or continual maintenance (i.e.: new nodes or roles added later) can be automatic, automatic with notification, or manual response to a notification.

Fifth, ports may be closed as services, processes or rules are no longer required. Sixth, security enhancements may be made to the rules/policies to not only apply to ports but also the full command breadth of firewalls such as IP inclusion or exclusion. Lastly, the pairings of nodes to rules may be logged and saved as part of change control. Any part of the change control may be restored or used on another cluster or clone. The logging may be done via a version control file or database.

Table 1 illustrates an exemplary use case in a Spectrum Scale cluster, where a toolkit, /usr/lpp/mmfs/<build>/installer/spectrumscale builds a list of nodes in the cluster and their corresponding roles. Of course, it should be noted that the exemplary use case shown in Table 1 is set forth for illustrative purposes only, and thus should not be construed as limiting in any manner.

TABLE 1

[root@prt001 st001 installer]# ./spectrumscale node list
[INFO] List of nodes in current configuration:
[INFO] [Installer Node]
[INFO] 10.18.48.11

TABLE 1-continued

[INFO] Setup Type: SpectrumScale
[INFO]
[INFO] [Cluster Name]
[INFO] gpfscluster.ss
[INFO]
[INFO] [Protocols]
[INFO] Object: Disabled
[INFO] SMB: Enabled
[INFO] NFS: Enabled
[INFO]
[INFO] GPFS Node Admin Quorum Manager NSD Server Protocol GUI Server OS Arch
[INFO] nsd001 st001 X X rhel7 ppc64le
[INFO] nsd002st001 X X rhel7 ppc64le
[INFO] prt001st001 X X X X rhel7 ppc64le
[INFO] prt002st001 X X rhel7 ppc64le
[INFO] prt003st001 X X rhel7 ppc64le
[INFO] prt004st001 X X rhel7 ppc64le
[INFO] prt005st001 X X rhel7 ppc64le
[INFO] prt006st001 X X X X rhel7 ppc64le
[INFO] prt008st001 X X X X rhel7 ppc64le
[INFO]

The use case shown in Table 1 may result in roles and it gives which the enablement of the NFS and SMB protocols.

Table 2 illustrates the exemplary opening of different firewall ports for NFS, SMB, GPFS, GUI, and Installer roles. Of course, it should be noted that the exemplary firewall port openings shown in Table 2 are set forth for illustrative purposes only, and thus should not be construed as limiting in any manner.

TABLE 2

CHEF
8889/tcp
Repository
10080/tcp
GPFS INtra Cluster
1191/tap
1191/udp
22/tcp
NFS
2049/tcp
2049/udp
111/tap
111/udp
32780/tcp
32780/udp
32781/tap
32781/udp
32782/tcp
32782/udp
32783/tcp
32783/udp
SMB
445/tcp
4379/tcp
INSTALLATION GUI
9080/tcp
9080/udp
9443/tcp
9443/udp
MANAGEMENT GUI
80/tcp
80/udp
443/tcp
443/udp
4444/tcp
4444/udp Table 1 has an "X" next to the node name. Table 2 depicts the specific port number/protocol, and this port listing is an example port listing for one specific node, resulting in the opening of those firewall ports. In on embodiment, these ports may be opened automatically according to the nodes roles in the node list. Optionally, if the admin prefers, they can be asked "Yes" or "No" before any changes are applied. In this way, changes may be automatic or with permission.

Additionally, Spectrum Scale provides a command "mmchnode". This too can use a pre-determined set of pairings of firewall to role to open and close ports based on changing a nodes function in the cluster.

Also, Spectrum Scale provides a command "mmces service stop nfs or smb". This command turns off the NFS services on a node. This method would be able to identify this service stop, and close or open the ports accordingly. When mmces service start nfs is issued, the tool would see that the NFS service is started and a firewall rule can be turned back on to open the NFS ports.

In this way, a firewall port may be turned on and off for a node based on processes or services stopping and starting within that node. This may also be tied to roles that change with something like the IBM Spectrum Scale mmchnode command. This command changes a nodes functions or abilities to run different processes. The firewall changes can be dynamic with the mmchnode command. Also, it can be dynamic based on a daemon running that monitors for stopping and starting of processes and services.

Additionally, in a clustered environment, during the cluster software installation, cluster types and roles are described. Firewall rules may be deployed during the cluster software installation so that an admin does not have to do this as a separate step. The installation can also include a daemon that monitors process, services and role changes to apply complementary firewall rules to the firewall.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which includes one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A computer-implemented method, comprising:
    identifying a node within a clustered system;
    comparing processes, services, and applications currently running on the node to predetermined processes, services, and applications that are associated with predetermined roles within the clustered system;
    assigning one of the predetermined roles to the node in response to determining that the processes, services, and applications currently running on the node match a predetermined number of predetermined processes, services, and applications linked to the one of the predetermined roles, wherein the predetermined role is assigned to the node in response to an initial deployment of the clustered system, wherein the predetermined role assigned to the node is stored as metadata within the node; and setting one or more firewall parameters for the node within the clustered system, based on the predetermined role assigned to the node, wherein the one or more firewall parameters include one or more limitations imposed by the firewall.

2. The computer-implemented method of claim 1, wherein the node is identified in response to an addition of the node to the clustered system.

3. The computer-implemented method of claim 1, wherein the node is identified in response to a failure of another node within the clustered system.

4. The computer-implemented method of claim 1, wherein the node is identified in response to an initial deployment of the clustered system.

5. The computer-implemented method of claim 1, comprising:
identifying a change to the processes, services, and applications currently running on the node, the change occurring in response to a failure of another node within the clustered system, where the node is a backup node for the other node;
comparing the changed processes, services, and applications currently running on the node to the predetermined processes, services, and applications that are associated with the predetermined roles within the clustered system to determine a second predetermined role of the node; and
updating the one or more firewall parameters for the node within the clustered system, based on the second predetermined role of the node.

6. The computer-implemented method of claim 1, wherein the one or more firewall parameters include allowing only read access through one or more predetermined ports within the clustered system, and allowing access through one or more additional predetermined ports to only a predetermined set of internet addresses listed in a table.

7. The computer-implemented method of claim 1, wherein the firewall parameters for the node include:
an opening of ports determined to be necessary for the processes, services, and applications linked to the one of the predetermined roles,
a closing of ports determined to be not necessary for the processes, services, and applications linked to the one of the predetermined roles, and
a limiting of data access via one or more predetermined ports within the clustered system.

8. The computer-implemented method of claim 1, comprising dynamically turning a firewall port on for the node in response to another process and/or another service starting within the node; and dynamically turning a firewall port off for the node in response to the another process and/or the another service stopping within the node.

9. The computer-implemented method of claim 1, comprising detecting that one of the processes and/or services running on the node has stopped; and turning off a firewall port that is associated with the stopped process and/or service for the node in response to the detection.

10. The computer-implemented method of claim 1, wherein the predetermined role assigned to the node is compared to a table to find a matching predetermined role, and predetermined firewall parameters associated with the matching predetermined role are set for the node.

11. The computer-implemented method of claim 1, wherein the clustered system includes a cloud computing environment.

12. A computer program product comprising one or more computer readable storage media, and program instructions collectively stored on the one or more computer readable storage media, the program instructions comprising instructions configured to cause one or more processors to perform a method comprising:
identifying, by the one or more processors, a node within a clustered system;
comparing, by the one or more processors, processes, services, and applications currently running on the node to predetermined processes, services, and applications that are associated with predetermined roles within the clustered system;
assigning, by the one or more processors, one of the predetermined roles to the node in response to determining that the processes, services, and applications currently running on the node match a predetermined number of predetermined processes, services, and applications linked to the one of the predetermined roles,
wherein the predetermined role assigned to the node is stored as metadata within the node; and
setting, by the one or more processors, multiple firewall parameters for the node within the clustered system, based on the predetermined role assigned to the node,
wherein the firewall parameters include allowing only read access through one or more predetermined ports within the clustered system, and allowing access through one or more additional predetermined ports to only a predetermined set of internet addresses listed in a table.

13. The computer program product of claim 12, wherein the node is identified in response to an addition of the node to the clustered system.

14. The computer program product of claim 12, wherein the node is identified in response to a failure of another node within the clustered system.

15. The computer program product of claim 12, wherein the node is identified in response to an initial deployment of the clustered system.

16. The computer-implemented method of claim 1, wherein:
a graphical user interface (GUI) role is assigned to the node in response to determining that the processes, services, and applications currently running on the node include one or more graphical user interface (GUI) processes that match a predetermined number of predetermined processes, services, and applications linked to the GUI role within a table,
a storage role is assigned to the node in response to determining that the processes, services, and applications currently running on the node include one or more storage processes that match a predetermined number of predetermined processes,
services, and applications linked to the storage role within the table, and an application server role is assigned to the node in response to determining that the processes, services, and applications currently running on the node include one or more application server processes that match a predetermined number of predetermined processes, services, and applications linked to the application server role within the table.

17. The computer-implemented method of claim 1, wherein the firewall parameters include:
- an opening and closing of one or more predetermined ports within the clustered system, where the predetermined ports that are opened include ports determined to be necessary for the processes, services, and applications associated with the predetermined role assigned to the node, and the ports that are closed include ports determined to be not necessary for the processes, services, and applications associated with the predetermined role assigned to the node, and
- limitations including allowing only read access through one or more predetermined ports within the clustered system, and allowing access through one or more additional predetermined ports to only a predetermined set of internet addresses listed in a table;
- wherein the predetermined role is assigned to the node in response to an initial deployment of the clustered system,
- wherein the predetermined role assigned to the node is stored as metadata within the node, and further comprising:
- identifying a change to the processes, services, and applications currently running on the node in response to a failure of another node within the clustered system, where the node is a backup node for the other node;
- comparing the changed processes, services, and applications currently running on the node to the predetermined processes, services, and applications that are associated with the predetermined roles within the clustered system to determine a second predetermined role of the node; and
- updating the one or more firewall parameters for the node within the clustered system, based on the second predetermined role of the node.

18. The computer-implemented method of claim 1, wherein:
- each of the predetermined roles includes a function of the node within the clustered system,
- within one or more tables, each of the predetermined roles is linked to its predetermined processes, services, and applications, and
- the comparing includes comparing the processes, services, and applications currently running on the node to the one or more tables to determine a match.

19. A system, comprising:
- a hardware processor; and
- logic integrated with the processor, executable by the processor, or integrated with and executable by the processor, the logic being configured to:
  - identify a node within a clustered system;
  - compare processes, services, and applications currently running on the node to predetermined processes, services, and applications that are associated with predetermined roles within the clustered system;
  - assign one of the predetermined roles to the node in response to determining that the processes, services, and applications currently running on the node match a predetermined number of predetermined processes, services, and applications linked to the one of the predetermined roles,
  - wherein the predetermined role is assigned to the node in response to an initial deployment of the clustered system,
  - wherein the predetermined role assigned to the node is stored as metadata within the node; and
  - set one or more firewall parameters for the node within the clustered system, based on the predetermined role assigned to the node.

* * * * *